UNITED STATES PATENT OFFICE.

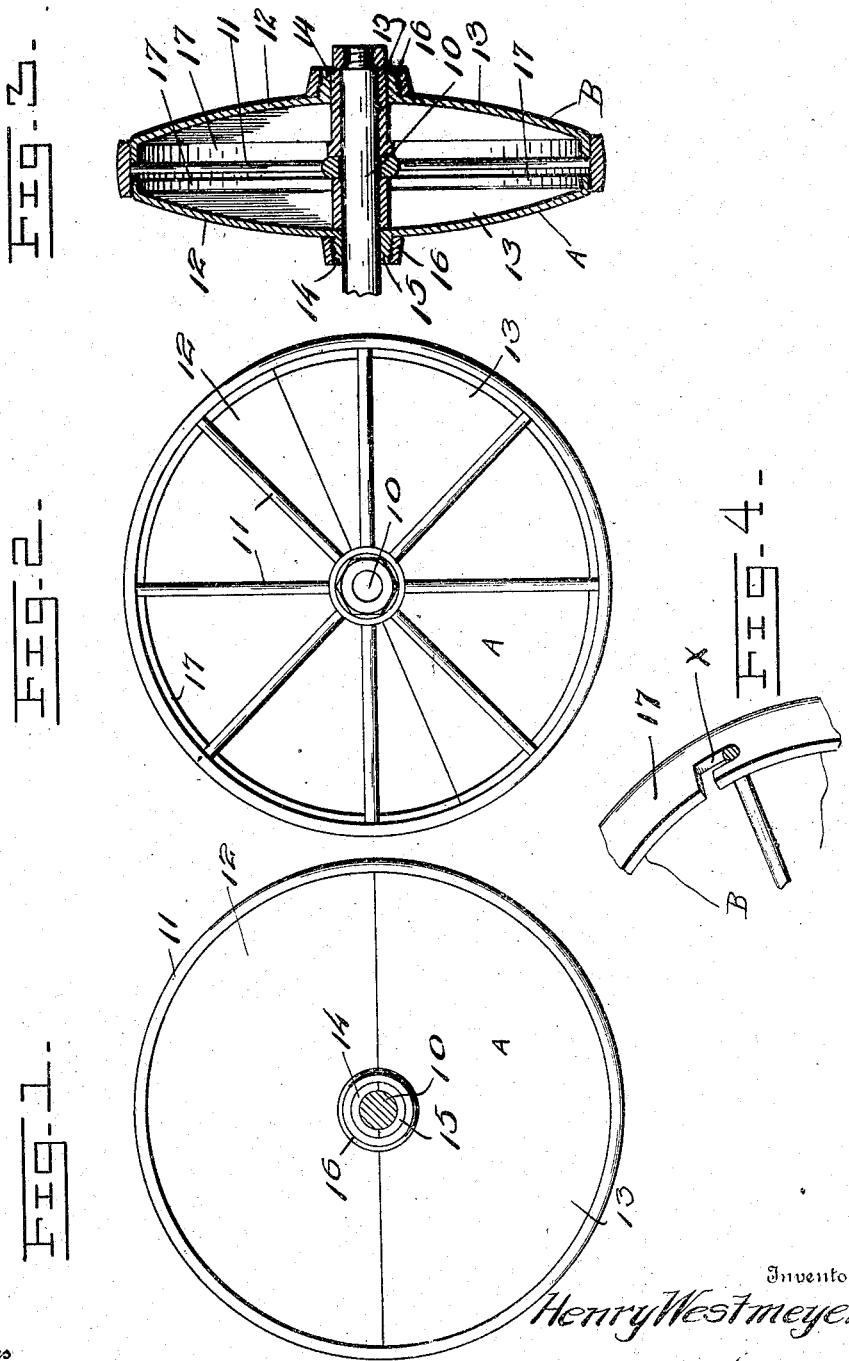

HENRY WESTMEYER, OF SILVER CREEK TOWNSHIP, MERRICK COUNTY, NEBRASKA.

ATTACHMENT FOR WHEELED PLOWS.

No. 930,447.      Specification of Letters Patent.      Patented Aug. 10, 1909.

Application filed January 28, 1909. Serial No. 474,671.

*To all whom it may concern:*

Be it known that I, HENRY WESTMEYER, a citizen of the United States, residing in Silver Creek township, in the county of Merrick and State of Nebraska, have invented certain new and useful Improvements in Attachments for Wheeled Plows, of which the following is a specification.

This invention relates to plows and has special reference to an attachment to be applied to wheeled plows.

An object of the invention is to form a device which is applicable to the rear wheel of a plow of this class which will prevent the accumulation of grass or the like which collects about the wheel and axle and tends to overheat the same.

Another object of the invention is the provision of a device of this character which may be easily applied and which is of light weight so that the same will not materially alter the operation of the machine.

The invention has for a further object the provision of a device of this nature which can be manufactured economically owing to its simplicity of construction, and peculiar formation.

Other objects and advantages will be apparent from the following description and it will be understood that changes in the specific structure shown and described may be made within the scope of the claims and that any suitable materials may be used without departing from the spirit of the invention.

In the drawings forming a portion of this specification, and in which like characters of reference indicate similar parts in the several views, Figure 1 is an inner side elevation of the rear wheel of a plow having the attachment applied thereto, Fig. 2 is an opposite side elevation of the same with the outer attachment removed, Fig. 3 is a vertical central section through the wheel and attachment, the guards being shown attached at both the outer and inner sides of the wheel. Fig. 4 is a detail view showing the structure in which the flange of the outer guard member is provided with spoke engaging notches.

Referring to the drawings, 10 designates an axle carried by a wheeled plow and which is shown only partially, upon which is rotatably disposed a wheel 11.

The attachment A which is adapted to be applied to the inner side of the wheel 11 and which is supported upon the axle 10 comprises two semicircularly formed convexed plates 12 and 13 which are each provided with semicircular flanges of frusto-conical formation which are designated by the numerals 14 and 15 and which are adapted to be engaged oppositely upon the axle 10. The flanges 14 and 15 are threaded upon their outer faces over which is engaged a collar 16 employed for the purpose of clamping the flanges 14 and 15 against the axle 10 when the same is positioned upon said threaded portions. The outer circular edges of the plates 12 and 13 are provided with inturned flanges 17 which engage upon the inner face of the rim of the wheel 11 for the purpose of preventing the access of mud or the like which engages about the spokes of a wheel and with the axle thereby hindering the proper operation of the same. The plates 12 and 13 are convexed for the purpose of throwing off substances which tend to collect about the wheel instead of allowing the same to collect thereon. This result is further effected by reason of the fact that the plates 12 and 13 are held in rigid position and do not revolve thereby preventing the twisting or knotting of grass or the like about the same. The opposite side of the wheel 11 is similarly provided with an attachment B to prevent the access of mud or grass from engagement with the wheel, the attachment in this instance being similar to the attachment A but being engaged with the wheel hub and rotating with the wheel.

Fig. 4 shows a structure in which the flange 17 is provided with spoke engaging notches X.

What is claimed is:—

1. A device of the class described comprising two semicircular convexed plates, out-turned semicircular flanges of frusto-conical formation carried by said plates, a sleeve adapted for threaded engagement with said flanges and inturned flanges disposed about the semicircular edges of said plates.

2. A device of the class described comprising two semicircular convexed plates, inturned flanges disposed about the edges of said plates for engagement against the inner face of a wheeled rim, outturned semicircular flanges formed centrally of said plates for engagement about a stationary axle and a collar for threaded engagement over said outturned flanges for clamping the same to the axle.

In testimony whereof I affix my signature, in presence of two witnesses.

HENRY WESTMEYER.

Witnesses:
J. W. JACKMAN,
A. M. DAVIES.